March 4, 1969 — L. A. KOLZE — 3,430,918
BALL SEAT TYPE FLUID FLOW VALVE
Filed April 21, 1967

INVENTOR.
LAWERENCE A. KOLZE
BY *Hill, Sherman, Meroni, Gross & Simpson* ATTORNEYS

United States Patent Office 3,430,918
Patented Mar. 4, 1969

3,430,918
BALL SEAT TYPE FLUID FLOW VALVE
Lawrence A. Kolze, Bensenville, Ill., assignor to The Dole Valve Company, Morton Grove, Ill., a corporation of Illinois
Filed Apr. 21, 1967, Ser. No. 632,576
U.S. Cl. 251—152       5 Claims
Int. Cl. F16k 51/00

ABSTRACT OF THE DISCLOSURE

A fluid flow valve for sweat connection into a piping system. The valve includes a valve body and a pair of cup-shaped members mounted on opposite sides of the body. Gaskets are disposed between the cup-shaped members and the sides of the valve body to provide a fluid tight seal therebetween. Pipe couplings are mounted on the cup-shaped members for sweat connection into the piping system. The couplings may be made of brass and the cup-shaped members are made of stainless steel. The gaskets may be rubber and the valve body may be brass or plastic. The stainless steel cup-shaped members between the couplings and the gaskets reduce the transfer of heat from the couplings to the gaskets when the couplings are heated during a sweating operation.

Background of the invention

This invention relates generally to the field of fluid flow valve and more particularly to flow valves of the ball seat type.

Ball seat type fluid flow valves in general are known in the prior art. Such valves may comprise a valve body having a fluid flow passageway extending therethrough. A spherical ball-shaped valve member is disposed in the flow passageway and is mounted on a rotatable valve stem for movement into and out of seating engagement with a valve seat. The valve member is rotatably mounted on the valve stem such that the flow of fluid through the passageway tends to rotate the valve member to present different surfaces thereof to the valve seat for seating engagement therewith.

A pair of pipe couplings are mounted on opposite sides of the valve for connection into a piping system. Gaskets made of rubber or the like material are generally interposed between the valve body and the pipe couplings or coupling mounting members to provide a fluid seal therebetween.

The pipe couplings may be made of brass or similar material for sweat connection to copper tubing. Such sweat connections are normally made in the field and require rather intensive heating of the couplings, as will be understood by those skilled in the art.

Since brass has a relatively high coefficient of heat transmission the entire valve may warm-up considerably during a sweating operation. The temperature of the valve around the gaskets may rise to a level which is injurious to the gasketing material, and leakage of the valve may result.

It is to the problem of avoiding excessive heating of the gasketing material during a sweating operation that the present invention is primarily directed.

Summary of the invention

The present invention solves the problem of the prior art by interposing a coupling mounting member having a relatively low coefficient of heat transmission between the pipe coupling and the gasket. This not only maintains the temperature of the gaskets at a safe level during a sweating operation but has the additional salutary effect of reducing the time required during a sweating operation by restricting to the pipe couplings the heat applied thereto.

More specifically, the present invention comprises a fluid flow valve of the ball seat type including a valve body having a pair of flat end walls. A flow passageway extends through the valve body and a pair of cup-shaped members are disposed respectively adjacent the end walls. Each of the cup-shaped members include a flange engaging its respective end wall in surrounding relation to the flow passageway. A pair of pipe couplings are mounted respectively on the cup-shaped members and gaskets are disposed between the end walls of the valve body and the cup-shaped members for providing fluid seals therebetween. The cup-shaped members are made of stainless steel to reduce the transfer of heat from the pipe couplings to the gaskets during a sweating operation, thus not only causing the pipe couplings to heat up more rapidly, but also preventing the gaskets from being heated excessively.

Other salient features of the invention include the use of rubber as the gasketing material and the use of brass or plastic in making the valve body. The use of plastic in the manufacturing of the valve body results in cost economy.

It is, therefore, an object of the present invention to provide a fluid flow valve of the ball seat type having gasketing material therein and adapted for a sweat connection into a piping system with means for preventing excessive temperature rise of the gasketing material during a sweating operation.

Another object of the invention is to provide a fluid flow valve having brass pipe couplings with coupling mounting members made of material having a low coefficient of heat transmission for restricting the heat applied to the couplings during a sweating operation to the couplings themselves.

Another object of the invention is to provide a valve body constituted of plastic in order to reduce the costs involved in the manufacture of the valve body.

Many other features, advantages and additional objects of the present invention will become manifest to those versed in the art upon making reference to the detailed description which follows and the accompanying sheets of drawings in which preferred structural embodiments incorporating the principles of the present invention are shown by way of illustrative example only.

Description of the preferred embodiment

Figure 1:
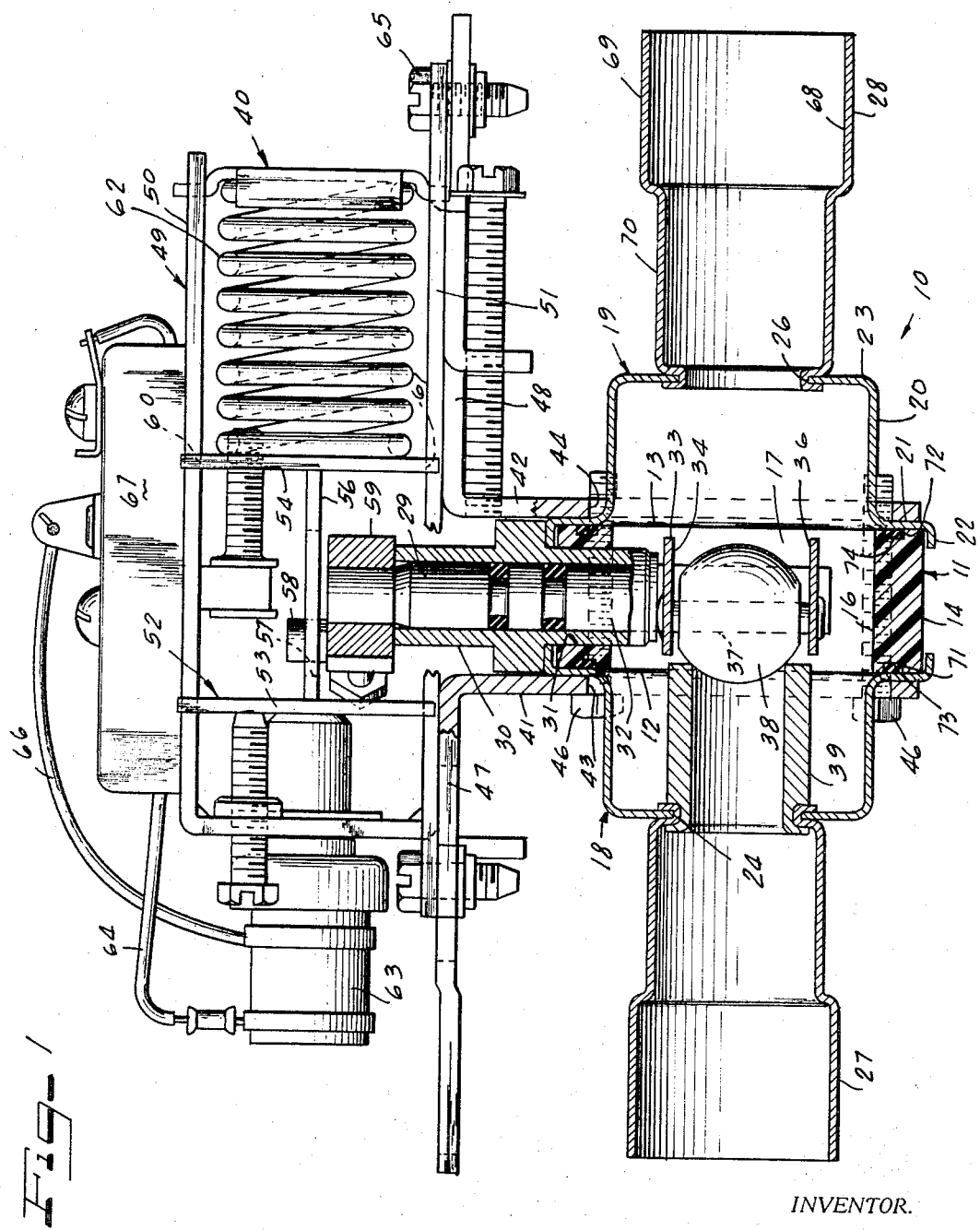
FIGURE 1 is a vertical sectional view of a ball seat fluid flow valve constructed in accordance with the principles of the present invention.
Figure 2:
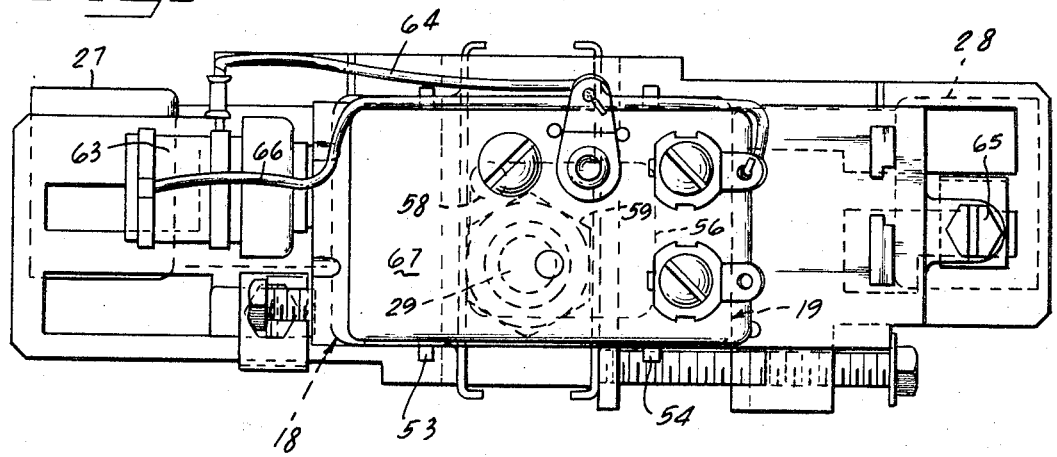
FIGURES 2 and 3 are respectively top plan and end elevational views of the valve shown in FIGURE 1.
Figure 3:
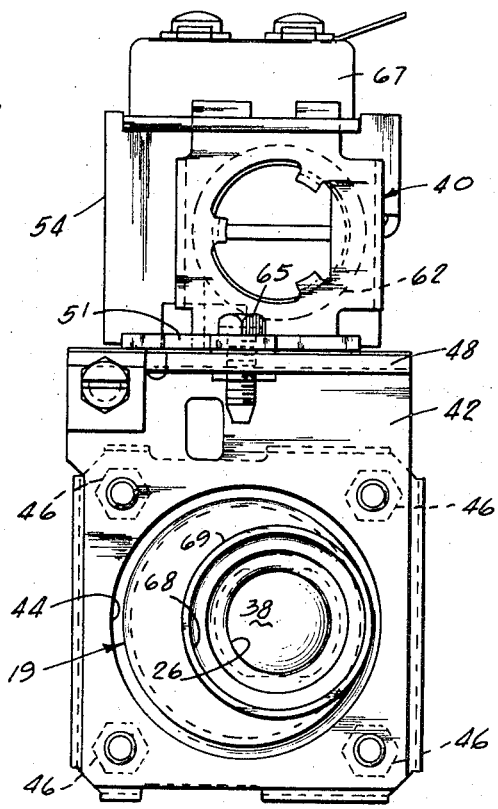

Referring to the drawings reference numeral 10 indicates generally a fluid flow valve which embodies the principles of this invention. The valve 10 is more particularly characterized as comprising a valve body 11 in the form of a parallelepiped and comprising a pair of flat spaced parallel end walls 12 and 13 transversely extending side walls 14. The valve body 11 is substantially centrally apertured as at 16 to provide a flow passageway 17 between the end walls 12 and 13.

Situated on opposite sides of the valve body 11 adjacent the end walls 12 and 13 are a pair of cup-shaped members 18 and 19 which may be made of sheet form material. Each of the cup-shaped members comprises a tubular portion 20 aligned axially with the flow passageway 17 and a flat circumferentially continuous outturned flange 21 disposed in abutting engagement with its respected end wall 12 or 13 in surrounding relation to the flow passageway 17. A circumferentially continuous inturned ear 22 is formed on the flange 21 and is flattened over the side walls 14 of the valve body 11.

The cup-shaped members 18 and 19 further respectively comprise radial walls 23 having fluid inlet and outlet openings 24 and 26 formed therein in axial alignment. Pipe couplings 27 and 28 are connected in fixed assembly to the cup-shaped members 18 and 19 for connecting the valve 10 into a suitable piping system.

The valving mechanism of the valve 10 comprises a rotatable valve stem 29 journalled in a bushing 30 which is inserted into an aperture 31 which opens into the flow passageway 17. A lower end 32 of the valve stem 29 is disposed within the flow passageway 17 and has securely mounted thereon a bifurcated member 33 having spaced parallel legs 34 and 36 of the bifurcated member 33.

Rotatably carried on the pin 37 is a segmental spherical or ball shaped valve member 38 adapted for seating engagement with a tubular valve seat 39 extending from the inlet opening 24 into the flow passageway 17.

The valve stem 29 may be rotated in opposite directions for moving the valve member 38 into and out of seating engagement with the valve seat 39 by means of a valve operating mechanism 40, the mechanism 40 is mounted on the valve body 11 by means of a pair of flat parallel end plates 41 and 42 disposed adjacent the end walls 12 and 13 of the valve body to overlie flanges 21, 21 of the cup-shaped members 18 and 19. The plates 41 and 42 further comprise means forming apertures 43 and 44 to receive respectively the tubular portions 20 of the cup-shaped members 18 and 19. The end plates 41 and 42 are clamped together to sandwich the valve body 11 therebetween by means of a plurality of suitable clamping devices such as the threaded bolts indicated at reference numeral 46.

The end plates 41 and 42 further comprise outturned support flanges 47 and 48 upon which is mounted a guide frame 49 comprising upper and lower legs 50 and 51 which extend at right angles to the axis of rotation of the valve stem 29. Disposed between the legs 50 and 51 is an H-shaped operating bracket 52 comprising spaced parallel wall members 53 and 54 extending vertically and horizontal wall member 56 interconnected in fixed assembly to the vertical wall members 53 and 54.

In order to turn the valve stem 29 a slot 57 is formed in the horizontal wall member 56 to receive a stud 58 mounted in axially offset relation on the valve stem 29 by means of a split clamp 59. The operating bracket 52 is carried for reciprocable movement on the guide frame 49 and as the operating bracket 52 moves in one direction the valve stem 29 is rotated to seat the valve member 38 of the valve seat 39. As the bracket 52 is moved in an opposite direction the valve member 38 is unseated to permit fluid flow through the valve.

The operating bracket 52 is guided for reciprocable movement on the guide frame 49 by means of notched portions 60 and 61 situated at the upper and lower ends of the vertical wall members 53 and 54. The operating bracket 52 is biased in a leftward direction as viewed in FIGURE 1 by means of a coil spring 62 and is movable rightwardly by suitable power means such as an electrically heated thermal power element 63. A pair of wires 64 and 66 may be interconnected between the heater of the thermal element 63 and a terminal panel 67 mounted on top of the upper leg 50 of the guide frame 49. Threaded fasteners as indicated at 65 may be conveniently utilized to mount the guide frame 49 securely to the outturned flanges 47 and 48 of the end plates 41 and 42.

Since the valve 10 is particularly suited for sweat connection into a piping system an inner wall 68 of each of the pipe couplings 27 and 28 is free of threads as would normally be provided for a threaded connection. Instead, each of the couplings 27 and 28 comprises an enlarged diameter end portion 69 adapted to slip telescopically over the end portion of a piece of copper tubing having a diameter substantially equal to the diameter of a reduced diameter portion 70 of the coupling.

In order to provide a fluid tight seal between the end walls 12 and 13 of the valve body 11 and the abutting flanges 21 of the cup-shaped members 18 and 19 a pair of annular grooves 71 and 72 are formed in the end walls 12 and 13 in surrounding relation to the aperture 16 and receives therewithin a pair of gaskets 73 and 74. The gaskets may be made of elastic material such as rubber and dimensioned so as to be in a state of compression in the assembled state thereof.

In sweat connecting the pipe couplings 27 and 28 to copper tubing or the like the couplings are heated by suitable means such as a blowtorch as will be understood by those skilled in the art. The couplings 27 and 28 are constructed of brass or similar material capable of sweat connection and due to the relatively high coefficient of heat transmission which is characteristic of brass the cup-shaped members 18 and 19 receive a substantial portion of the heat applied to the couplings 27 and 28.

This heat could be transmitted to the gaskets 73 and 73 and have serious adverse effects on the sealing properties of the gaskets, particularly if the gaskets are made of rubber or the like. In order to reduce this heat transmission, however, the cup-shaped members 18 and 19 of the present invention are made of stainless steel, a material which has a relatively low coefficient of heat transmission.

By isolating the heat applied to the pipe couplings 27 and 28 to the couplings themselves not only are the gaskets 73 and 74 protected from injurious rises in temperature, but the time required for the sweating operation is reduced since the couplings are heated up to and maintained at the required temperature more readily.

The valve body 11 may be made of plastic in order to reduce the cost of manufacture. Although plastic is not ordinarily capable of withstanding the relatively high pressures to which a valve body is normally subjected without excessive distortion, in accordance with the principles of this invention the valve body 11 is subjected to almost purely compression forces, thereby reducing distortion to an acceptable level.

Accordingly, the relatively heavy metal end plates 41 and 42 and the inturned ears 22, 22 of the end caps 18 and 19 serve to girdle the valve body 11. This girdling effect increases the hydraulic force capability of the valve body 11 and is of particular advantage where the valve body 11 is constructed of plastic since it reduces the stresses to which the valve body is subjected.

Although minor modifications might be suggested by those versed in the art, it should be understood that I wish to embody within the scope of the patent warranted hereon all such modifications as reasonably come within the scope of my contribution to the art.

I claim as my invention:

1. A ball seat type fluid flow valve comprising a valve body having a pair of flat parallel spaced end walls and a side wall interconnecting said end walls, means forming a longitudinal flow passageway through said valve body between said end walls, means forming an aperture in said valve body between said side wall and said flow passageway, a bushing in said aperture, a valve stem rotatably carried in said bushing, a fragmental spherical valve member mounted on said valve stem for relative rotation therewith and situated in said flow passageway, a pair of cup-shaped members disposed respectively adjacent said end walls, each of said cup-shaped members having a flange, engaging its respective end wall in surrounding relation to said flow passageway, an inlet and an outlet opening formed respectively in said cup-shaped members and communicating with each other through said flow passageway, a tubular valve seat extending from said inlet opening into said flow passageway and having a longitudinal axis lying in coplanar relation with the center of said spherical valve member, a pair of tubular pipe couplings mounted respectively on said cup-shaped members in surrounding relation to said inlet and said outlet openings for connecting to fluid circulating pipes, valve stem operating means for rotating said valve stem between a first position at which said valve member is seated on said valve seat to prevent fluid flow through said valve and a second position at which said valve member is spaced from said valve seat to accommodate fluid flow through said valve, and a pair of gaskets situated respectively between said end walls of said valve body and said flanges of said cup-shaped members for providing a fluid seal therebetween, said cup-shaped members being made of stainless steel to minimize heat transfer from said couplings to said gaskets.

2. The fluid flow valve as defined in claim 1 wherein said pipe couplings are made of brass to accommodate sweat connections with the fluid supply pipes.

3. The fluid flow valve as defined in claim 1 wherein said gaskets are made of rubber.

4. The fluid flow valve as defined in claim 1 wherein said valve body is made of plastic.

5. The fluid flow valve as defined in claim 1 wherein said valve body is made of plastic and further comprising inturned lips formed respectively on said cup-shaped members flattened over the side walls of said valve body, a pair of spaced parallel end plates apertured to receive said cup-shaped members and overlying said end walls of said valve body and said flanges of said cup-shaped members, and means clamping said end plates together to sandwich said valve body therebetween, whereby said valve body is girdled by said inturned lips and said end plates to accommodate higher hydraulic forces without distortion.

References Cited

UNITED STATES PATENTS 3,182,952    5/1965    Montesi _____ 251—148
3,357,678    12/1967    Dyki _____ 251—148

M. CARY NELSON, *Primary Examiner.*

W. R. CLINE, *Assistant Examiner.*

U.S. Cl. X.R.

251—367